United States Patent [19]

Sakuyama et al.

[11] 4,430,589
[45] Feb. 7, 1984

[54] ROTOR OF A SUPERCONDUCTIVE ROTARY ELECTRIC MACHINE

[75] Inventors: Masaki Sakuyama, Ashiya; Norio Oishi; Kouichi Okamoto, both of Kobe; Masatami Iwamoto; Tatsuei Nomura, both of Itami; Shiro Nakamura, Takarazuka, all of Japan

[73] Assignee: Mitsubishi Denki Kabushiki Kaisha, Tokyo, Japan

[21] Appl. No.: 363,773

[22] Filed: Mar. 31, 1982

[30] Foreign Application Priority Data

Apr. 2, 1981 [JP] Japan .................................. 56-50878
May 29, 1981 [JP] Japan .................................. 56-84139

[51] Int. Cl.³ .............................................. H02K 9/00
[52] U.S. Cl. ..................................... 310/52; 310/214; 310/270
[58] Field of Search ............... 310/261, 264, 265, 270, 310/45, 214, 215, 10, 40, 52, 61, 64, 42, 262

[56] References Cited

U.S. PATENT DOCUMENTS

| 3,821,568 | 6/1974 | Gillet | 310/214 |
| 4,085,343 | 4/1978 | Hasegawa | 310/261 |
| 4,143,290 | 3/1979 | Mizukami | 310/270 |
| 4,275,324 | 6/1981 | Flick | 310/270 |
| 4,277,705 | 7/1981 | Rios | 310/261 |
| 4,278,906 | 7/1981 | Kullmann | 310/261 |
| 4,282,450 | 8/1981 | Eckels | 310/261 |
| 4,339,681 | 7/1982 | Bogner | 310/52 |
| 4,368,399 | 1/1983 | Ying et al. | 310/270 |

FOREIGN PATENT DOCUMENTS

| 51-150402 | 12/1976 | Japan | 310/52 |
| 54-113808 | 9/1979 | Japan | 310/52 |
| 56-46706 | 11/1981 | Japan | 310/52 |

Primary Examiner—R. Skudy
Attorney, Agent, or Firm—Wenderoth, Lind & Ponack

[57] ABSTRACT

The rotor of a superconductive rotary electric machine has a coil-carrying shaft carrying superconductive field coils. A plurality of axially running parallel grooves and a pair of annular circumferentially running indentations, each of which is connected to one end of each of the grooves, are formed on the outer surface of the coil-carrying shaft. The axially and circumferentially running portions of the field coils are accommodated in the grooves and indentations respectively, and the spaces left by the circumferentially running portions of the field coils in the indentations are filled by electrically insulating fillers. Further, a plurality of wedges are fitted into the grooves above the axially running portions of the field coils, while a pair of sleeves are fitted around the coil-carrying shaft over the indentations, each of the sleeves being fitted around the coil-carrying shaft only at one end thereof which is situated farther from the central portion of the coil-carrying shaft than the other end thereof. Rings for preventing the slippage of the sleeves are interposed between the portions of the surfaces of the sleeves and the coil-carrying shaft which are fitted together.

4 Claims, 6 Drawing Figures

ROTOR OF A SUPERCONDUCTIVE ROTARY ELECTRIC MACHINE

BACKGROUND OF THE INVENTION

1. Field of the Invention

This invention relates to a rotor of a superconductive rotary electric machine, and more particularly to the mounting structure of the superconductive field coils on the coil-carrying shaft of such a rotor.

2. Description of the Prior Art

The electrical resistance of certain metals, such as lead, tin, and vanadium, and alloys, such as niobium-tin and niobium-titanium, become vanishingly small, i.e. they become superconductive, when the temperature thereof falls below the transition temperatures thereof which are in the neighbourhood of a few degrees above absolute zero. Thus, when the field windings of an alternating current generator, for example, are formed of such a superconductive material and cooled below the transition temperature thereof, then a large magnetic field can be established without the expenditure of appreciable amounts of electrical energy. Alternating current generators having rotors which carry superconductive field windings have already been constructed. In such superconductive rotors, however, secure and reliable mounting of the superconductive field coils on the coil-carrying shaft of the rotor is of paramount importance, because when the field coils are displaced by the vibrations due to the rotational movement of the rotor, the resulting frictional heat may destroy the superconductivity of the field coils. Further, as the field coils much be covered many times by a complicated covering structure for the purpose of preventing outside heat from entering thereinto, the checking and repairing thereof are difficult to perform.

Thus, it has already been proposed to wind the superconductive field coils around bobbins and then to mount the bobbins on the outer surface of the coil-carrying shaft. This makes it possible to wind the field coils separately from the coil-carrying shaft at a place where the winding operation can be performed effectively and reliably. The bobbins, however, make the dimension of the rotor larger and increase the production cost and production time thereof.

Thus, another mounting structure for mounting the field coils on the coil-carrying shaft has been proposed to solve the above-mentioned problem caused by using bobbins. Namely, grooves having forms corresponding to the rectangular-loop-shaped field coils are formed on the outer surface of the coil-carrying shaft, and the field coils are accommodated in these grooves. A plurality of wedges are then fitted into recesses formed in the side surfaces of the grooves above the portions thereof which accommodate the field coils, thereby keeping the field coils situated thereunder securely in the proper positions thereof. The portions of the grooves running in the circumferential direction of the coil-carrying shaft, however, have the form of circular arcs and wedges of this shape for use according to this method are difficult to machine. The wedges and the recesses corresponding to these circumferentially running portions of the grooves are also curved. The complicated forms of the circumferentially running portions of the grooves and wedges result not only in increased production time and cost, but also in difficulty in the precise and reliable machining thereof.

SUMMARY OF THE INVENTION

Thus, an object of the present invention is to provide a rotor of a superconductive rotary electric machine in which the superconductive field coils are securely and reliably mounted on the coil-carrying shaft of the rotor, while the mounting operation of the field coils on the coil-carrying shaft can be performed at less cost, in less time and with more precision.

The rotor of a rotary electric machine according to the present invention comprises a coil-carrying shaft having a cylindrical outer surface, and at least one winding formed of electrically conductive linear material. A plurality of parallel grooves running in the axial direction of the coil-carrying shaft and a pair of annular indentations running in the circumferential direction of the coil-carrying shaft are formed on the outer surfaces of the coil-carrying shaft. Each of the indentations is connected to one end of each of the grooves. The axially running portions of the winding are disposed in the grooves corresponding thereto, while the end portions, i.e., the circumferentially running portions thereof are disposed in the pair of indentations. The spaces left by the end portions of the field coils in the indentations are filled by electrically insulating filler which is tightly fitted thereinto. A pair of hollow cylindrical sleeves are then fitted around the coil-carrying shaft over the pair of indentations, thereby keeping the end portions of the field coils securely in the proper positions thereof in the indentations.

Preferably, each of the sleeves is fitted around the coil-carrying shaft only at one end thereof which is situated farther from the central portion of the coil-carrying cylinder than the other end thereof, thereby avoiding the problem of frictional abrasion between the surfaces of the sleeves and the coil-carrying shaft and of making the dimensions of the rotor unnecessarily large. It is also preferred that rings for preventing the slippage of the sleeves with respect to the coil-carrying shaft are inserted between the portions of the inner surfaces of the sleeves and the outer surface of the coil-carrying shaft which are fitted together.

BRIEF DESCRIPTION OF THE DRAWINGS

Further objects and advantages of the present invention will become more apparent from the following detailed description of the preferred embodiments, taken in conjunction with the accompanying drawings, in which.

In the drawing, like reference numerals and characters represent like or corresponding parts.

DETAILED DESCRIPTION OF THE PREFERRED EMBODIMENTS

Referring now to FIGS. 1 to 4 of the drawings, a rotor structure of a superconductive rotary electric machine according to the present invention will be described.

Figure 1:
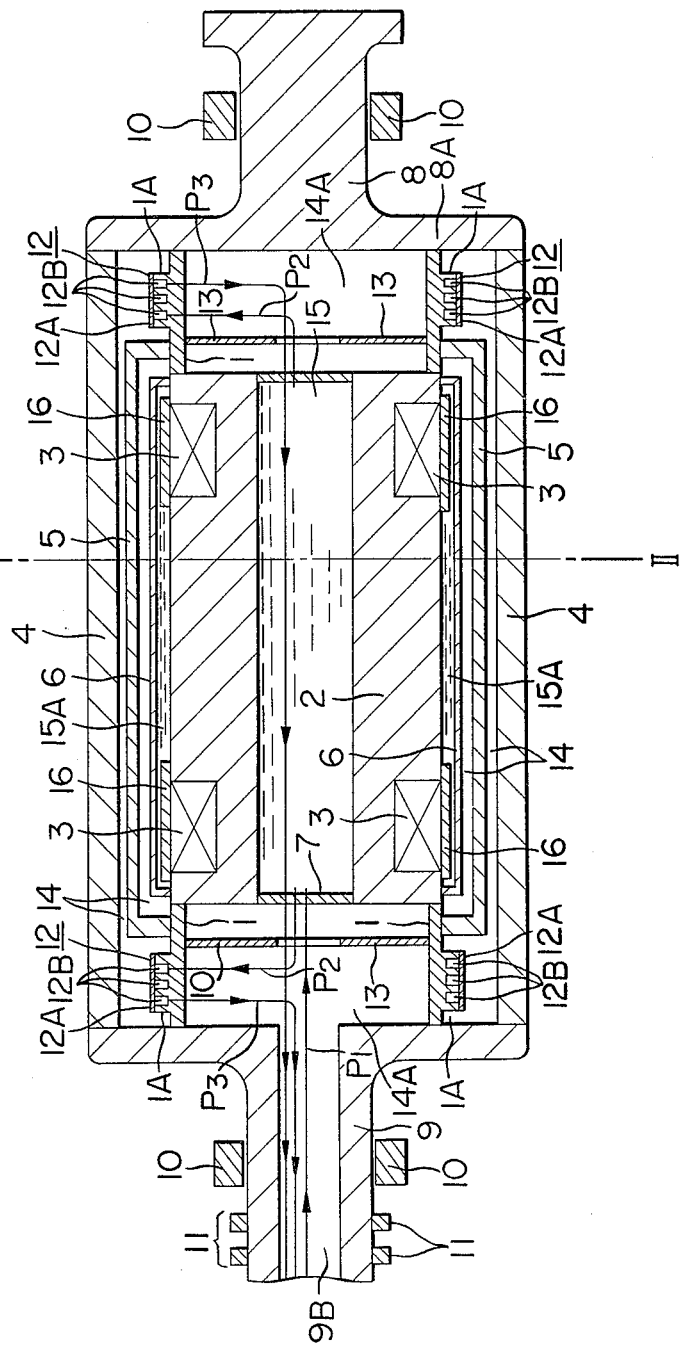
FIG. 1 is a cross-sectional side view of a rotor of a superconductive electric machine according to the present invention.

FIG. 1 shows an overall view of a rotor of an alternating current generator having superconductive field windings. The outer housing of the rotor is formed by a normal temperature damper 4, the disk-shaped portion 8A of the driving end shaft 8, and the outwardly turning annular flange portion 9A of the non-driving end shaft 9 having a central bore 9B therein, the driving and the non-driving end shafts 8 and 9 being rotatably supported by bearings 10. A coil-carrying shaft 2 having the form of a thick hollow cylinder is disposed coaxially within the normal temperature damper 4, the two ends of the coil-carrying shaft 2 being fixedly secured to a pair of torque tubes 1 having the form of thin hollow cylinders, which in their turn are fixedly mounted on the disk-shaped portion 8A and the annular flange portion 9A of the driving and the non-driving end shafts 8 and 9. Field coils 3 formed of a superconductive material are mounted on the outer side surface of the coil-carrying shaft 2. Each field coil 3 has substantially the form of a rectangular loop which has two straight sides running in the axial direction of the coil-carrying shaft 2, and the two circularly curved portions running in the circumferential direction thereof, the cross-sections of the curved portions of field coil 3 being schematically shown in FIG. 1. A pair of slip rings 11 is fitted around the non-driving end shaft 9 for the purpose of receiving field current supplied to the field coils 3.

A central liquid helium container 15 is defined by the inner surface of the coil-carrying shaft 2 and a pair of end plates 7 having the form of disks, liquid phase helium being supplied thereto through the helium supply pipe schematically shown at P1 extending through the central bore 9B of the non-driving side end shaft 9. A peripheral liquid helium container 15A is defined by the outer surface of the coil-carrying shaft 2 and a cylindrical outer wall 6, liquid helium being supplied thereto through communication ports (not shown) extending through the coil-carrying shaft 2 in the radial direction thereof. Thus, the field coils 3 are cooled by the liquid helium contained in the central and peripheral helium containers 15 and 15A. A low temperature damper 5 having the form of a hollow cylinder is disposed between the outer wall 6 of the peripheral helium container 15A and the normal temperature damper 4, and is fixedly mounted on the outer surface of the torque tubes 1. The cylindrical spaces between the normal temperature damper 4 and the low temperature damper 5, and between the low temperature damper 5 and the outer wall 6 of the peripheral helium container 15A, are kept at a high vacuum, thereby preventing the heat from outside from entering into the low temperature portion adjacent to the helium containers 15 and 15A. The spaces 14A within the torque tubes 1 are also kept at a vacuum, and radiation shields 13 having the form of annular plates are fixedly mounted on the inner surface of the torque tubes 1 for the purpose of preventing radiation heat from entering into the low temperature portion. Each torque tube 1 has formed on the outer side surface thereof a stepped out portion 1A in which a heat exchanger is formed, which comprises a helical groove defined on the circumferential surface of the stepped out portion 1A, and a lid 12A having the form of a hollow cylinder which covers the groove 12B. The helium contained in the central container 15 is supplied to one end of each groove 12B through the pipe schematically shown at P2, and exhausted from the other end of each groove 12B through the pipe schematically shown at P3 which leads the helium out through the central bore 9B of the non-driving side end shaft 9. Thus, the torque tubes 1 having a small thickness are cooled by the heat exchanger 12 and the conduction heat entering into the low temperature portion through the torque tubes 1 is minimized.

Figure 2:
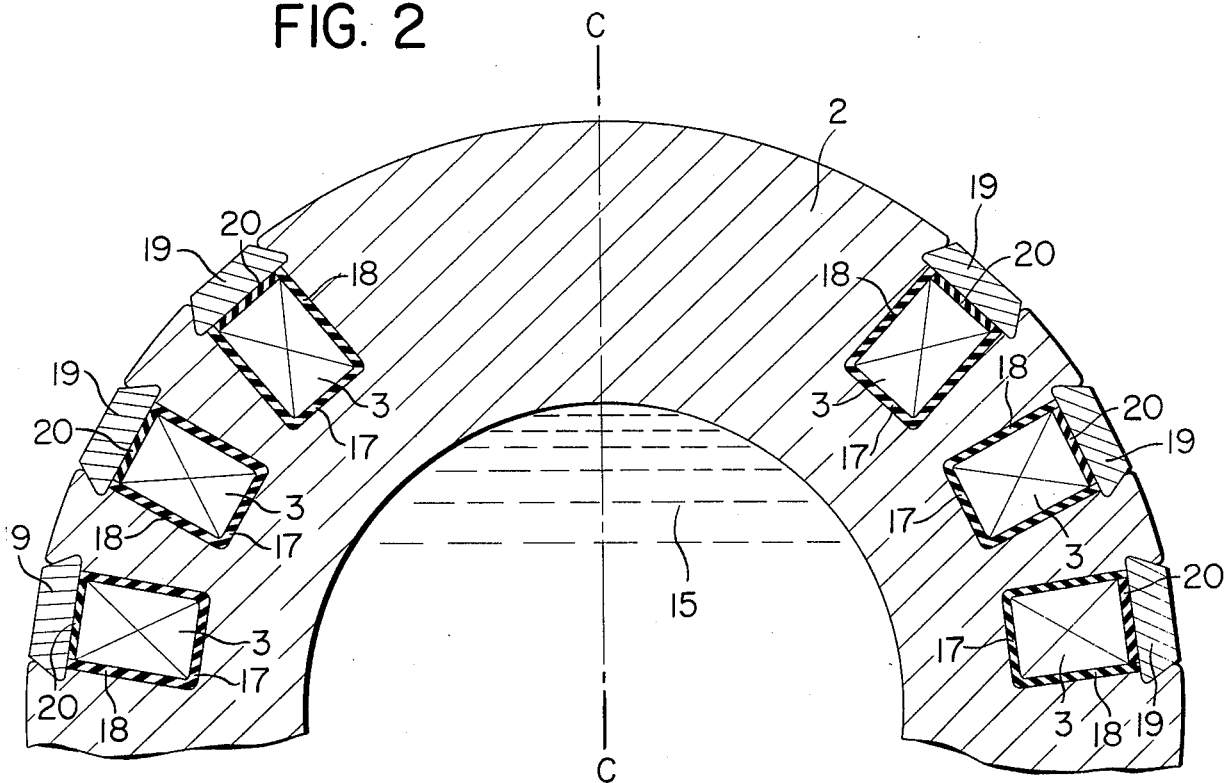
FIG. 2 is partial tranverse cross-sectional view of the coil-carrying shaft forming part of the rotor of FIG. 1, taken along the line II—II of FIG. 1.

FIG. 2 shows the cross-section of the coil-carrying shaft 2 taken along the line II—II of FIG. 1. The portions of the field coils 3 running in the axial direction of the coil-carrying shaft 2 are fitted into the grooves 17 formed on the surface of the coil-carrying shaft 2 corresponding thereto, electrically insulating layers 18 being interposed therebetween. The outer surfaces of the field coils 3 are covered by electrically insulating covers 20, and a plurality of wedges 19 are fitted into the recesses formed on the side surfaces of the grooves 17 above the portions thereof accommodating the field coils 3. Thus, the portions of the field coils 3 running in the axial direction of the coil-carrying shaft 2 are securely fitted into the grooves 17 and held in the proper positions thereof by the wedges 19. As the superconductive field coils 3 are wound around the line C—C of FIG. 2, a large magnetic field is established which has a polar axis corresponding to the line C—C.

Figure 3:
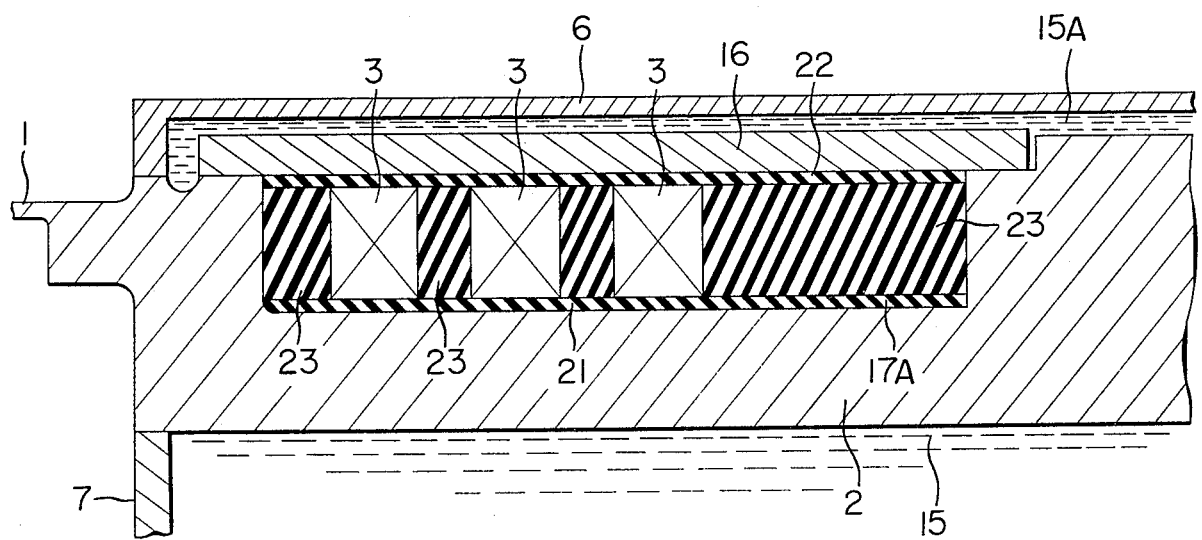
FIG. 3 is a longitudinal cross-sectional side view of a portion of one end of the coil-carrying shaft forming part of the rotor of FIG. 1.
Figure 4:
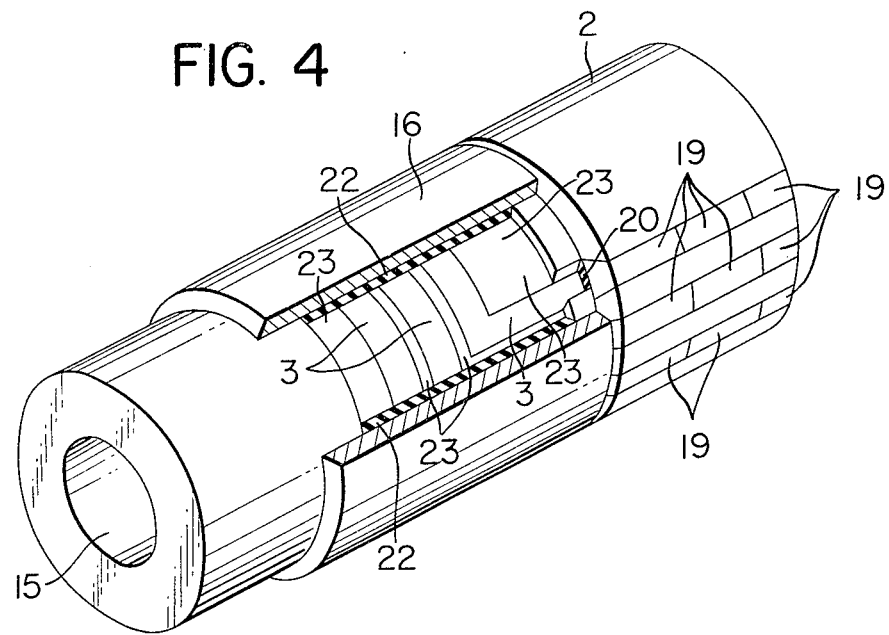
FIG. 4 is a partially broken-away perspective view of one end of the coil-carrying shaft of the rotor of FIG. 1.

FIGS. 3 and 4 show a cross-section and a perspective view of an end portion of the coil-carrying shaft 2 respectively. The end portions of the field coils 3, i.e., the portions thereof running in the circumferential direction of the coil-carrying shaft 2, are disposed in the pair of annular indentations 17A which are formed at the end portions of the coil-carrying shaft 2 in the circumferential direction thereof. The electrically insulating layers 21 are interposed between the bottom surfaces of the indentations 17A and the end portions of the field coils 3, and the spaces left by the field coils 3 in the indentations 17A are filled by the electrically insulating fillers 23 which are tightly fitted thereinto. The outer surfaces of the field coils 3 and the fillers 23 are covered by electrically insulating covers 22, and a coil-end keeper sleeve 16 having the form of a hollow cylinder is fitted by a shrinkage fit method around the coil-carrying shaft 2 over each of the indentations 17A formed at the two end portions of the coil-carrying shaft 2. Thus, the end portions of the field coils 3 are also securely and reliably held in the proper positions thereof by the fillers 23 and sleeves 16.

Figure 5:
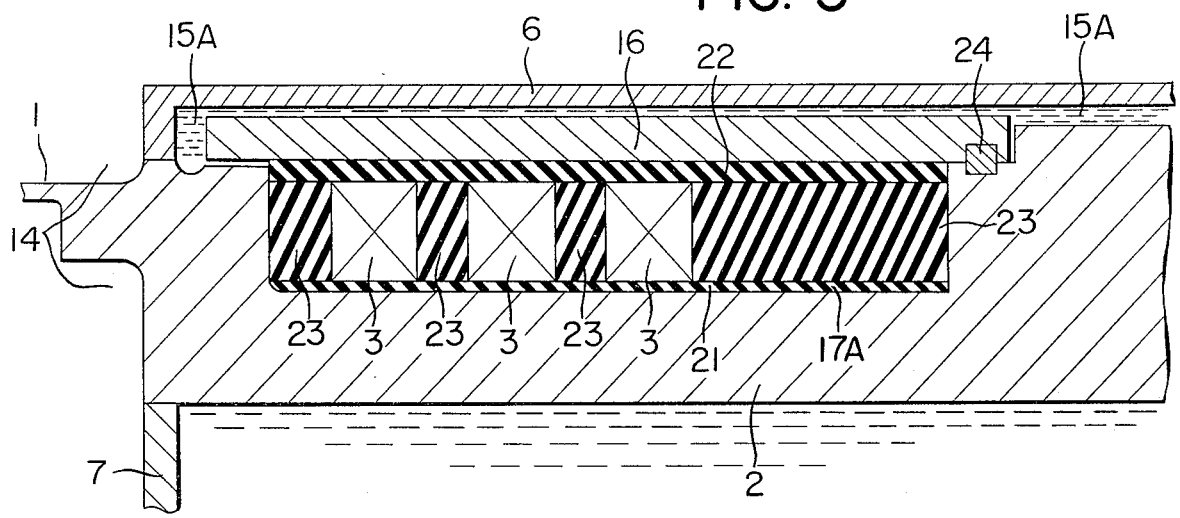
FIG. 5 is a view similar to that of FIG. 3, but showing a modification of the end structure of the coil-carrying shaft forming part of the rotor of FIG. 1.

Referring now to FIG. 5 of the drawings, another mounting structure of the end portions of the field coils 3 is described.

A pair of coil-end keeper sleeves 16 are shrinkage-fitted onto the coil-carrying shaft 2 of FIG. 5 at only one end thereof, i.e., the one end situated near the central portion of the coil-carrying shaft 2, and an inter-engagement ring 24 for preventing the slippage of each of the sleeves 16 with respect to the coil-carrying shaft 2 is fitted into an annular groove corresponding thereto in the outer and inner surfaces of the coil-carrying shaft 2 and each of the coil-end keeper sleeves 16 respectively. The other end of each of the sleeves 16 situated near the torque tubes 1 is not shrinkage-fitted, beacause when both ends of the coil-end keeper sleeves 16 are shrinkage-fitted to the coil-carrying shaft 2, the surfaces of the sleeve 16 at both ends thereof which are shrinkage-fitted are subjected to friction due to the vibrations of the coil-carrying shaft 2, and the heat generated by the friction causes fretting abrasion on the shrinkage-fitted surfaces.

In the case of the mounting structure of the end portions of the field coils 3 of FIG. 5, electrical insulation is necessary between the superconductive field coils 3 and the inter-engagement rings 24 which are fitted around the coil-carrying shaft 2 over the whole circumference thereof. Thus, if the inter-engagement rings 24 for preventing the slippage of the sleeves 16 are disposed at the ends of the sleeves 16 which are situated near the central portion of the coil-carrying shaft 2, then the inner diameter of the rings 24 cannot be made smaller than the diameter of the outer surfaces of the insulating covers 20 which are disposed on the axially running portions of the field coils 3 under the inter-engagement rings 24. The position of the rings 24, therefore, determines the thicknesses of the electrically insulating covers 22 and 20, which should be made greater than are necessary for electrical insulation except for the portions thereof situated under the rings 24. Thus, the spaces occupied by the field coils 3 become smaller as compared to the dimension of the rotor, which results in larger dimensions of the superconductive rotary electric machines.

Figure 6:
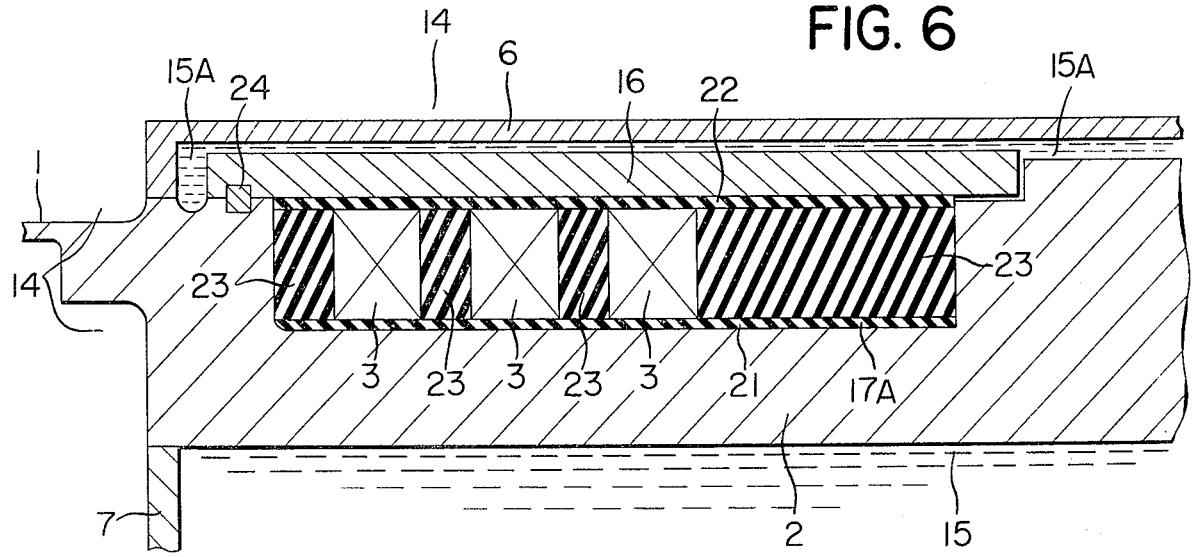
FIG. 6 is also a view similar to that of FIG. 3, but showing still more preferred modification of the end structure of the coil-carrying shaft forming part of the rotor of FIG. 1.

FIG. 6 shows a portion of an end portion of another rotor according to the present invention. Each of the pair of sleeves 16 is shrinkage-fitted to the coil-carrying shaft 2 only at one end thereof which is situated near the torque tubes 1, an annular inter-engagement ring 24 being fitted into the annular groove corresponding thereto formed on the outer and inner surfaces of the coil-carrying shaft 2 and each of the sleeves 16, for the purpose of preventing slippage of the sleeves 16 with respect to the coil-carrying shaft 2. Other portions of the rotor of FIG. 6 are constructed similarly to that of FIG. 5, which in turn is constructed in the same way as that of FIGS. 1 through 4 except for the portions specifically described above. In the case of the mounting structure of FIG. 6, the rings 24 are situated outside the surface portion of the coil-carrying shaft on which the field coils 3 are disposed, so that the electrically insulating covers 20 and 22 can be made to have smaller thicknesses which is enough for electrical insulation.

What is claimed is:
1. A rotor of a rotary electric machine comprising:
a coil-carrying shaft having a cylindrical outer surface having therein a plurality of parallel grooves running in the axial direction of the coil-carrying shaft and a pair of annular indentations running in the circumferential direction of the coil-carrying shaft, each of said indentations being connected to one end of each of said plurality of parallel grooves;
at least one winding formed of electrically conductive linear superconductive material having axially running portions disposed in said grooves and circumferentially running portions disposed in said indentations;
means for cooling said winding below a transition temperature of said superconductive material;
electrically insulating fillers fitted into spaces left by said winding in said indentations;
electrically insulating layers interposed between said circumferentially running portions of said winding and said indentations;
a pair of hollow cylindrical sleeves shrink fitted over said indentations onto said outer surfaces of said coil-carrying shaft; and
electrically insulating covers in said indentations between said circumferentially running portions of said winding and said shrink fitted sleeves, said shrink fitted sleeves tightly holding said electrically insulating layers, electrically insulating fillers, said circumferentially running coil portions and said insulating covers in said indentations.

2. A rotor of a rotary electric machine as claimed in claim 1, wherein each of said sleeves is fitted to the outer surface of the coil-carrying shaft at only one end portion of each of the sleeve.

3. A rotor of a rotary electric machine as claimed in claim 2 further comprising an annular ring interposed between said one end portion of each of the sleeves and said outer surface of said coil-carrying shaft, thereby preventing the slippage of each of the sleeves with respect to the coil-carrying shaft.

4. A rotor of a rotary electric machine as claimed in claim 2 or 3, wherein said one end of each of the sleeves is the end which is farther form the central portion of the coil-carrying shaft than the other end of each of the sleeves, the other end of each of said sleeves being spaced slghtly from said shaft.

* * * * *